United States Patent
Chin et al.

(10) Patent No.: US 8,451,408 B2
(45) Date of Patent: *May 28, 2013

(54) ELECTRICALLY TUNABLE LIQUID CRYSTAL LENS SET WITH CENTRAL ELECTRODE

(75) Inventors: Chi-Yuan Chin, Taipei (TW); Kuei-Jyun Chen, Taoyuan County (TW); Yong Cao, Fujian (CN); Rong-Li Liu, Fujian (CN); Geng Zhong, Sichuan (CN); Zheng Xu, Hangzhou (CN); Ling-Yuan Tseng, Saratoga, CA (US)

(73) Assignee: Silicon Touch Technology Inc., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,128

(22) Filed: Jun. 22, 2012

(65) Prior Publication Data

US 2012/0262663 A1    Oct. 18, 2012

Related U.S. Application Data

(63) Continuation-in-part of application No. 12/396,613, filed on Mar. 3, 2009, now Pat. No. 8,228,472.

(60) Provisional application No. 61/033,050, filed on Mar. 3, 2008.

(51) Int. Cl.
*G02F 1/1337* (2006.01)
*G02F 1/13* (2006.01)

(52) U.S. Cl.
USPC ............................................ 349/123; 349/200

(58) Field of Classification Search
None
See application file for complete search history.

(56) References Cited

U.S. PATENT DOCUMENTS

| 8,228,472 B2* | 7/2012 | Tseng et al. ................. 349/123 |
| 2006/0164593 A1 | 7/2006 | Peyghambarian |
| 2011/0205342 A1 | 8/2011 | Lin |

* cited by examiner

*Primary Examiner* — Sarah Hahm
(74) *Attorney, Agent, or Firm* — Winston Hsu; Scott Margo (57) ABSTRACT

A liquid crystal lens cell set includes a plurality of liquid crystal lenses overlapping to each other. Each of the liquid crystal lenses is supported between a pair of flat layers. One of the layers supports a planar electrode made of ITO. The other electrode, also formed of ITO, is supported in the center of the opposing substrate and projects toward the center of the liquid crystal layer. A power supply creates a potential difference between the electrodes and imposes a non-uniform electric field on the liquid crystal modules which aligns them in which a way as to act as a lens. By varying voltage between the electrodes the focal length of the lens may be controlled. A central electrode may be in the form of a beam or of a pointed tip. An electrode having a central hole may be associated with the central electrode or the planar electrode.

15 Claims, 13 Drawing Sheets

ELECTRICALLY TUNABLE LIQUID CRYSTAL LENS SET WITH CENTRAL ELECTRODE

CROSS REFERENCE TO RELATED APPLICATIONS

This application is a continuation in part of U.S. application Ser. No. 12/396,613 filed on Mar. 3, 2009, which claims the benefit of U.S. Provisional application Ser. No. 61/033,050 filed on Mar. 3, 2008, both of which are incorporated herein entirely by reference.

BACKGROUND OF THE INVENTION

1. Field of the Invention

This invention relates to liquid crystal cells sandwiched between electrodes which exert a non-uniform field on the liquid crystals so as to cause them to act as lenses, and more particularly to such a cell in which the voltage between the electrodes may be varied to control the focal length of the lens and a liquid crystal lens set including a plurality of the cells stacked each other.

2. Description of the Prior Art

Electrically tunable liquid crystal lenses potentially provide important advantages of size and cost over mechanical zoom lenses. They might be used in cameras, binoculars and other opto-electronic devices.

Broadly, these devices employ a pair of electrodes sandwiching a liquid crystal cell. The electrodes are such as to align the liquid crystal molecules to provide a gradient refractive index profile on the lens, transverse to the light path. By use of a variable power supply to adjust the voltage between the electrodes, the focal lengths of the lenses can be varied between a very short focal length and to near infinity, One method proposed to generate a nonhomogeneous electric field within the LC layer is to provide one of the electrodes in spherical shape. Another proposal is to place a central hole in one of the electrodes so as to impose a nonhomogeneous across the LC element.

SUMMARY OF THE INVENTION

The present invention comprises an electrically tunable LC lens set including a plurality of liquid crystal lenses overlapping to each other along a vertical projective direction. Each of the liquid crystal lenses embodies an LC layer sandwiched between two planar nonconductive layers. One of the nonconductive layers is coated with an ITO (indium tin oxide) layer which acts as a transparent electrode. The other nonconductive layer is formed with a central electrode that projects toward the LC layer and the other electrode. The LC layer, the central electrode, and the other electrode are stacked along the vertical projective direction. The central electrode may take the form of a thin rod with its axis aligned normally to the LC layer or an electrode with a pointed tip terminating close to the LC layer. Either form of electrode may be connected to a power supply at the other end by either a conductive transparent ITO coating extending over an insulation layer or a single transparent conductor formed on the side of the insulation layer opposite to the LC layer. The insulation layer separates this conductive layer from the electrode tip so that the electric field imposed on the LC layer is primarily a function of the voltage between the central tip and the electrode layer on the opposite side of the LC layer.

The resulting nonhomogeneous field aligns the LC molecules so as to produce a refractive index gradient over the LC layer which causes it to act as a lens. By varying the voltage between the tipped electrode and the opposed flat electrode, the focal length of the resulting lens may be controlled.

This unique electrode structure can be combined with an ITO layer having a central hole which is substantially larger than the tip electrode diameter. This electrode could be formed on the opposite side of the insulation layer from which the tip electrode projects or it could constitute the opposing electrode on the opposite side of the LC layer. A high resistance material layer may be formed in the central hole.

The birefringency problem caused by liquid crystal material can be resolved either by use of two layers of liquid crystal aligned in orthogonal directions or through the use of a tin layer of polarizer film attached on top of the LC layer.

In the electrically tunable LC lens set of the present invention, two adjacent liquid crystal lenses may constitute identical or opposite lens effects for forming a required optical performance of the LC lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Other objects, advantages and applications of the present invention will be made apparent by the following detailed description of preferred embodiments of the invention. The description makes reference to the accompanying drawings in which.

DETAILED DESCRIPTION

Figure 1:
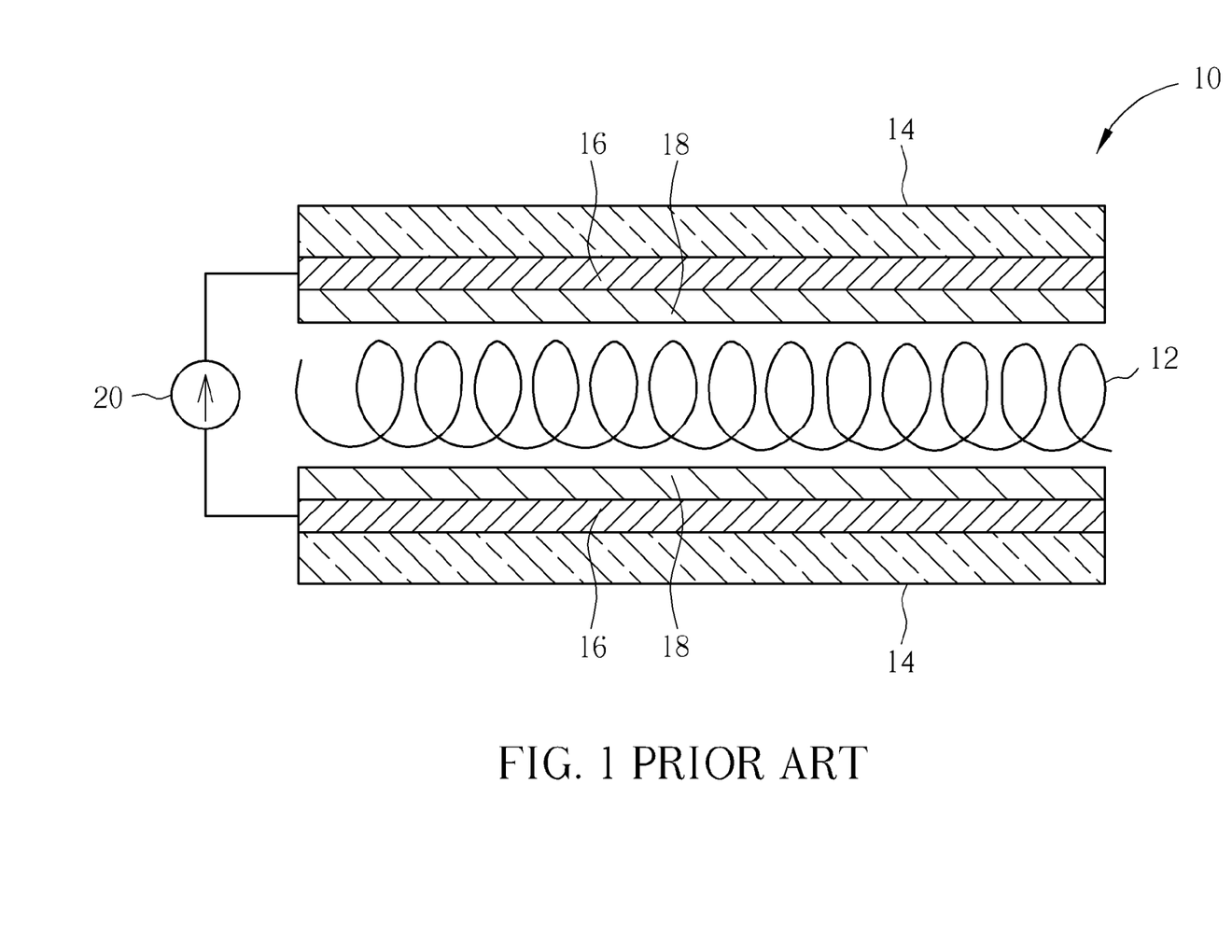
FIG. 1 is a schematic diagram of a conventional electrically tunable liquid crystal cell structure representing the prior art.

Referring to the drawings, FIG. 1 illustrates a prior art, electrically tunable liquid crystal cell, generally indicated at 10. The cell employs a planar liquid crystal layer 12 sandwiched between a pair of glass substrates 14. The opposed surfaces of the glass layers 14 are each coated with a thin ITO electrode 16. The surfaces of the ITO layer proximate the liquid crystal layer 12 are coated with alignment layers 18 which are preferably polyimide, $SiO_2$, or SiOx.

The two ITO layers are connected to a variable voltage power supply 20. By varying the voltage on the two ITO electrodes, a field is imposed on the LC layer which causes the LC molecules to align and produce a lens-like refraction of light passing through the cell. By adjusting the strength of the field the alignment may be varied to modify the focal length of the lens.

Figure 2:
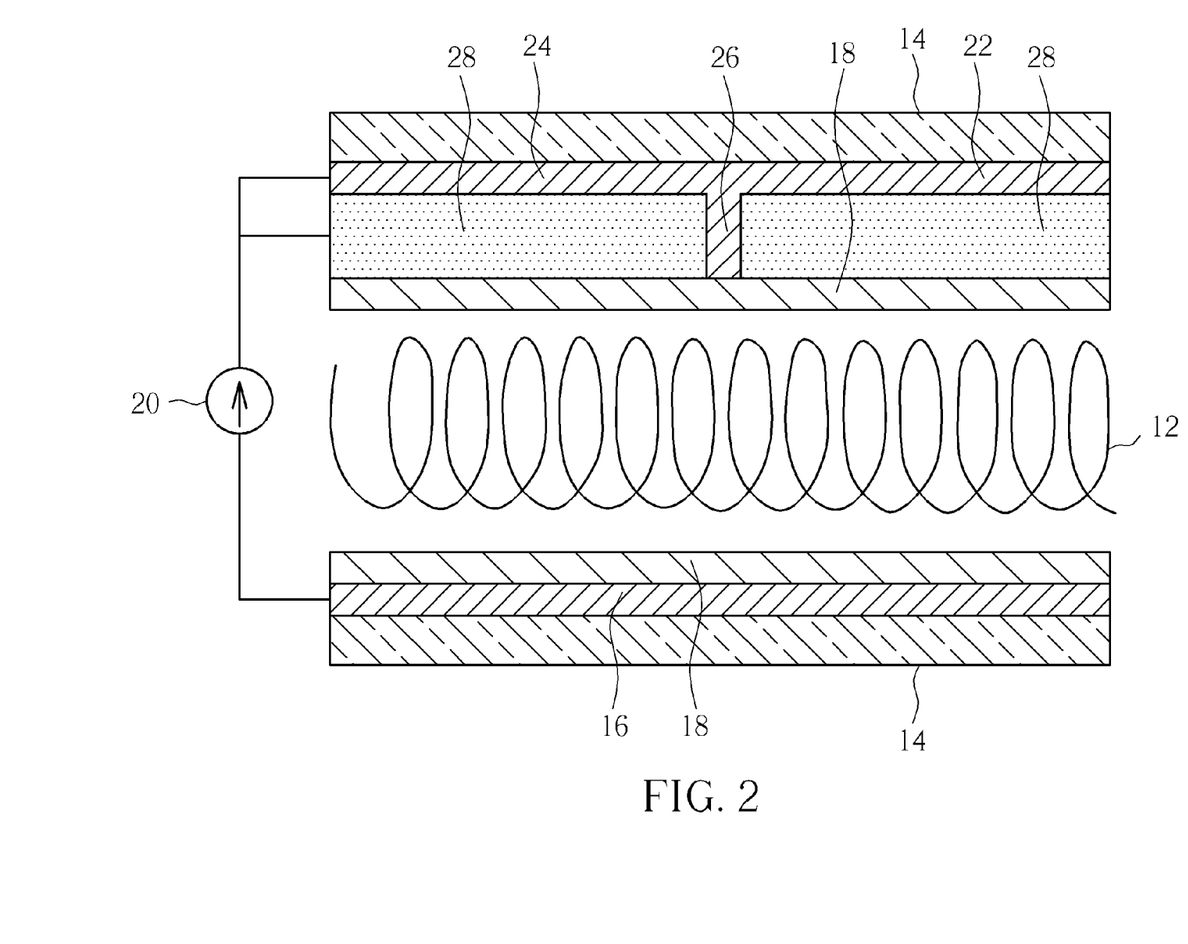
FIG. 2 is a schematic diagram of an electrically tunable liquid crystal cell structure forming a first embodiment of the invention.

FIG. 2 illustrates a preferred embodiment of our invention with the same numerals applied to the parts that are equivalent to the parts of the prior art device of FIG. 1. The preferred embodiment of the invention differs from the prior art in the structure of one of the ITO layers 22 and in the provision of an insulation layer 24. The ITO layer 22 is formed on the side of one of the glass layers 14 that opposes the liquid crystal layer 12. The electrode comprises a thin ITO layer 24 and a central tip 26 that projects from the surface of the layer 24 toward the LC layer 12. An alignment layer 18 is formed beyond the edge of the tip 26 so as to be proximate to the LC layer 12. The space between the section 24 of the ITO layer and the alignment layer 18 is coated with an insulation layer 28. The insulation layer must be electrically insulating and transparent. Preferably $SiO_2$ or SiOx may be employed. Since this insulation layer is adjacent to the alignment layer 18, they can be formed integrally. However, the surface of the alignment layer adjacent to the LC layer 12 must have some kind of grooves or rough formation so that the liquid crystal modules will fall into the layer, forming an angle typically referred to as the pre-tilting angle. If the alignment layer is $SiO_2$, or SiOx, then a sputtering or evaporating process may be used to form that layer as well as the insulation material. The thickness of the insulation layer could vary from several microns to several hundred microns. The alignment layer thickness is usually less than one micron. If the insulation layer and the alignment layer use the same inorganic material, then the insulation layer can serve as a base material and would be deposited vertically, while the alignment will be deposited obliquely. If the alignment layer uses an organic material such as polyimide, then a rubbing process will be used to create the pretilt angle.

The central projecting tip 26 of the ITO layer 24 results in a more intense field being opposed in the center of the LC layer, compared to its edges, so as to give a lens-like curvature to the refractive index of the LC layer. This produces a lens-like effect when incident light passes through the cell.

Figure 3:
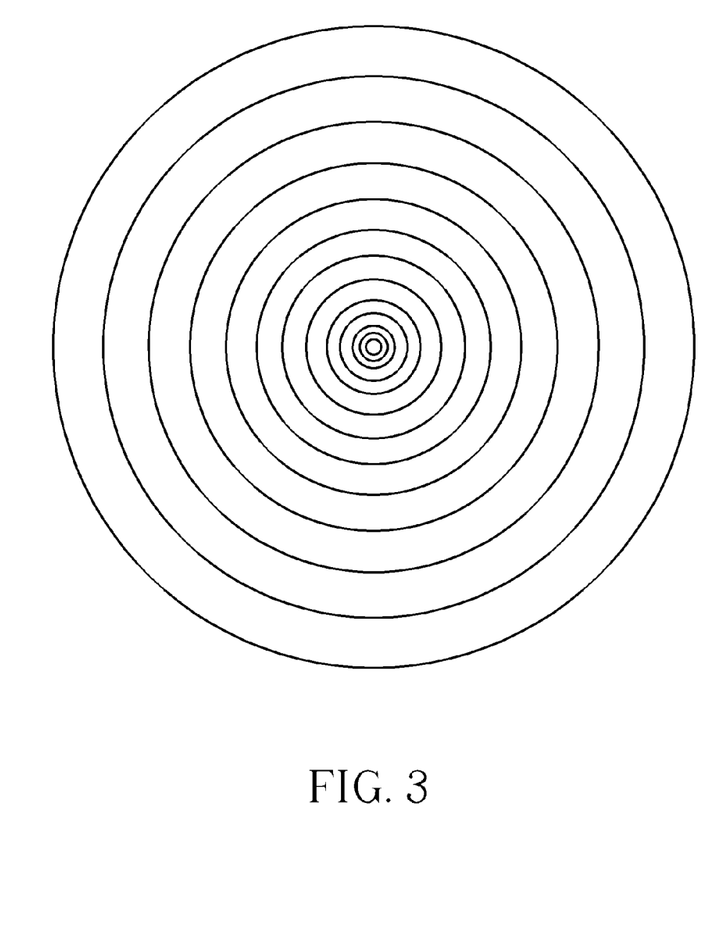
FIG. 3 is a plot of the interference fringes resulting from passing light through an electrically tunable liquid crystal structure formed in accordance with the present invention.

FIG. 3 is a diagram of the interference fringes produced when light passes through the structure of FIG. 1. The tip electrode 26 produces a fringe pattern of the highest frequency at the center and lowering in the direction of the edges.

Figure 4:
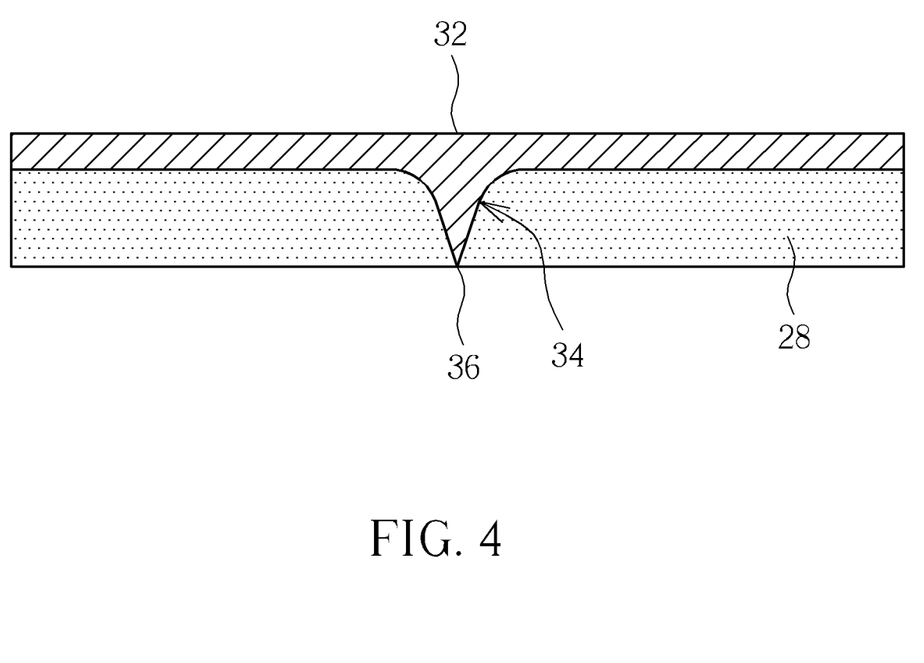
FIG. 4 is an illustration of an alternative embodiment of the tip electrode for use in an LC electrically tunable lens structure.

FIG. 4 illustrates an alternative form of the tip electrode which may be used with a structure of the type shown in FIGS. 1 and 2. The insulation layer 28 supports an ITO layer 32 which overlies the side of the insulation layer opposite to the LC layer and includes a central, pointed tip 34 which terminates in a pointed end 36 adjacent to the alignment layer. The pointed tip 36 produces a more extreme electric field gradient on the LC layer and allows even shorter focal distances to be achieved by the lens. Focal lengths in the order of seven centimeters have been achieved in prototype devices.

Figure 5:
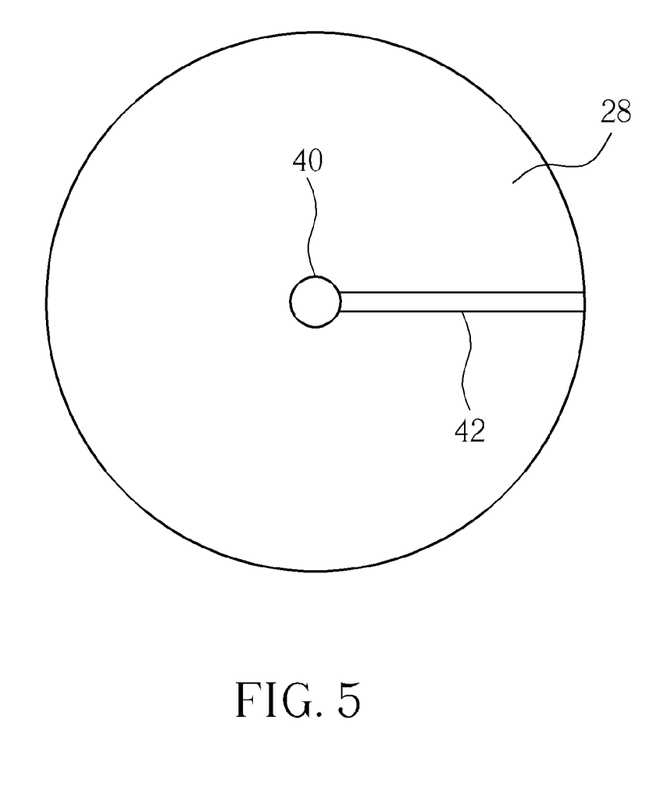
FIG. 5 is a top view of an LC lens structure using the lip electrode, illustrating an alternative of the method of connecting the central electrode to a power supply.

FIG. 5 is a top view of an alternative form of insulation layer and ITO layer. Rather than the ITO layer covering the entire surface of the insulation layer as illustrated in FIGS. 2 and 4, a central ITO tip in the form of the tips 26 of FIG. 2 or 34 of FIG. 4, indicated in FIG. 5 as 40, may be connected to a power supply by an ITO conductor 42 which connects the tip 40 to the edge of the insulation layer so that it can be connected to a power supply. This structure allows the use of thinner insulation layers 28 because the electric field imposed by the conductor 42 is so minimal as to not affect the performance of the device.

Figure 6:
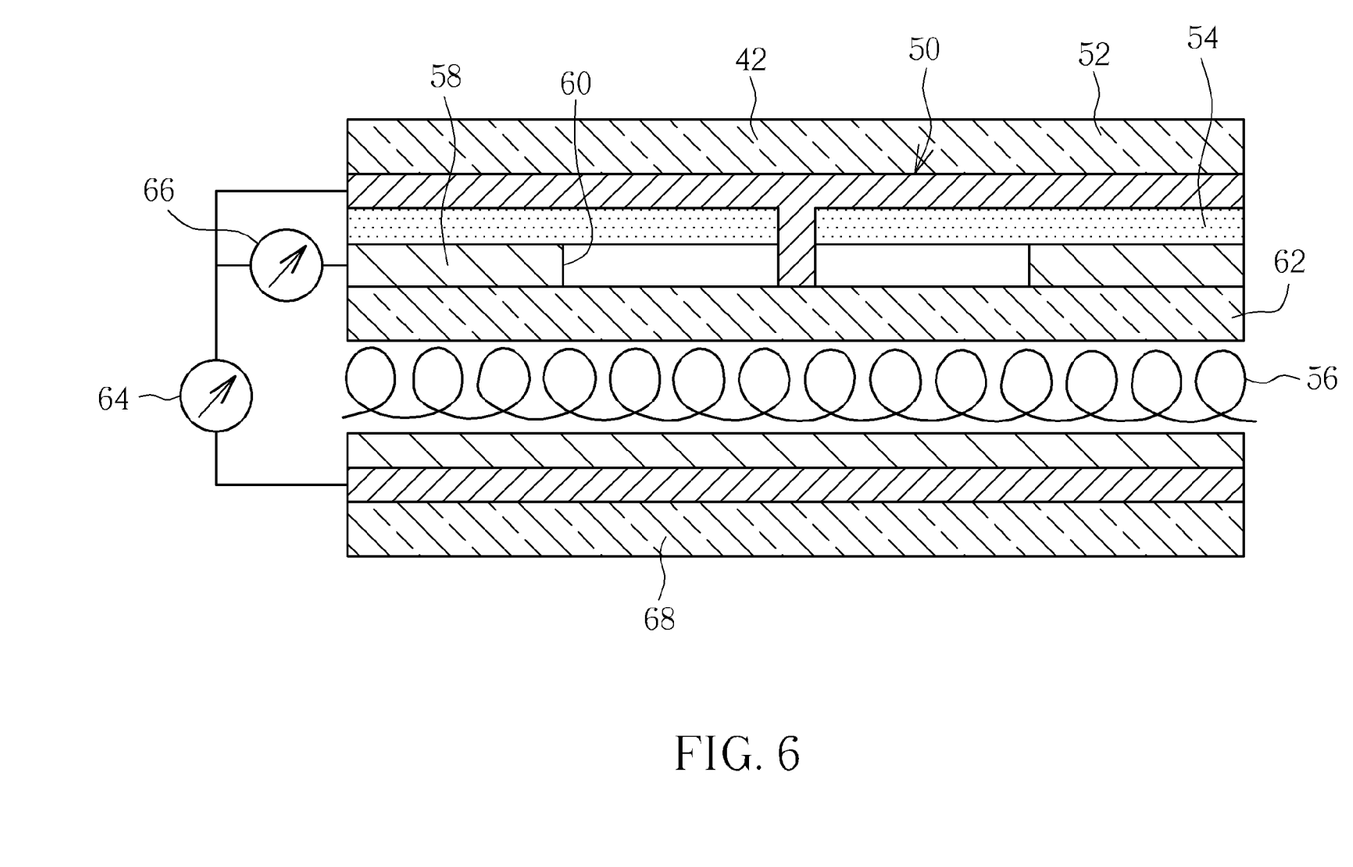
FIG. 6 is a schematic view of a layer for an LC electrically tunable lens employing a tip electrode in connection with an electrode having a central hole.

FIG. 6 illustrates an alternative structure for a tip electrode cell. A tip electrode 50 of the type illustrated in FIG. 2 is sandwiched between a glass substrate 52 and an insulating layer 54. A second ITO electrode 58 having a central hole 60 is formed surrounding the tip of the ITO layer 50. An alignment layer 62 completes the structure. A first variable voltage power supply 64 connects to the tip electrode 50. A second variable voltage power supply 66 is connected between the terminal of the power supply 64 that connects to the tip ITO layer 50 and the ITO layer 58 with the central hole 60. The other terminal of the power supply 64 connects to the planar ITO layer 68 supported on the opposite side of the liquid crystal layer 56. By varying the voltages imposed by the power supply 64 and 66, the focal length (and other optical parameters such as a spherical effects) of the resulting lens can be carefully controlled between a focus at near infinity and a focus within a few centimeters of the cell.

Figure 7:
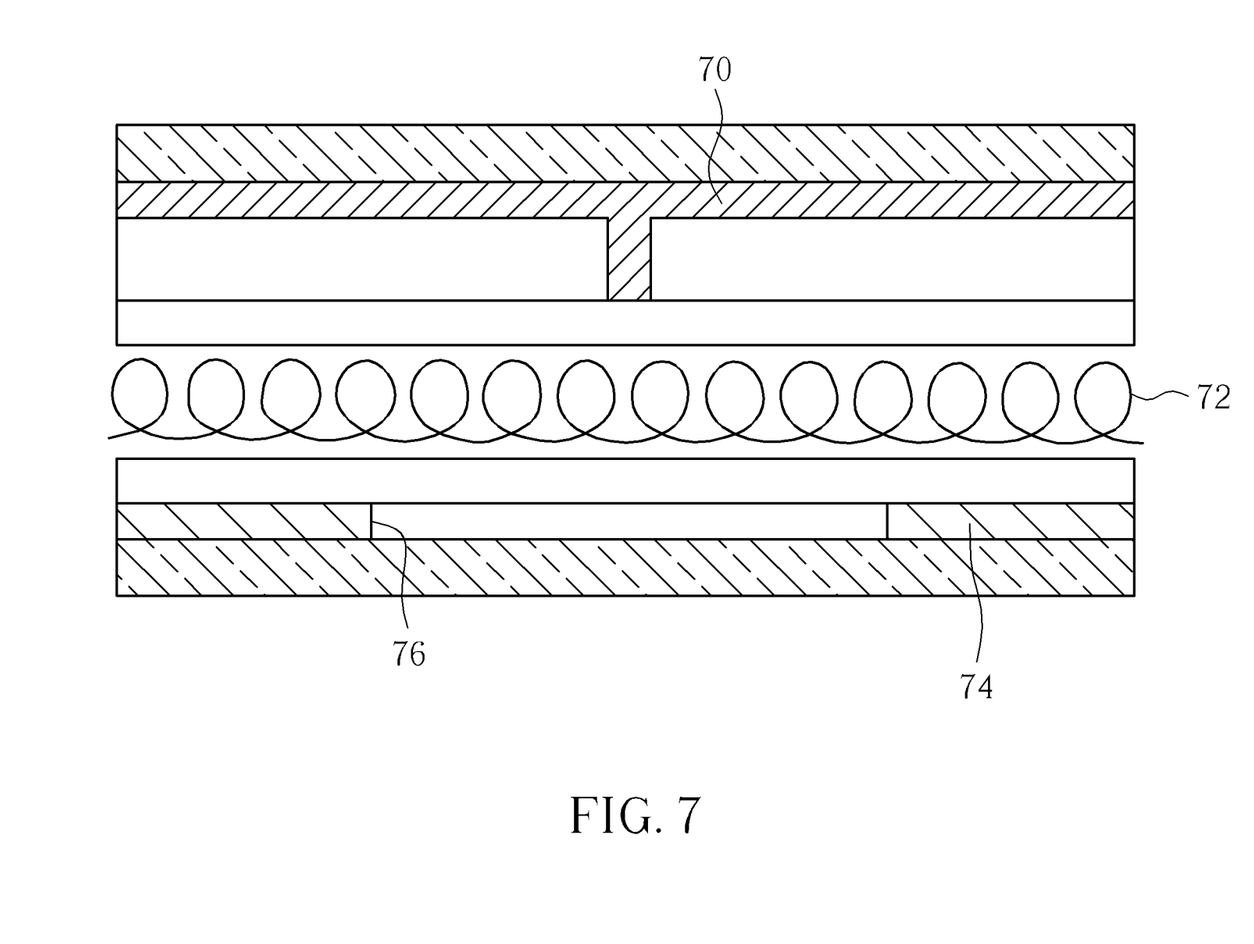
FIG. 7 is a schematic diagram of an LC electrically tunable lens structure employing a tip electrode on one side of the LC layer and an electrode with a central hole on the other layer.

In another embodiment of the invention illustrated in FIG. 7, an ITO in the form of a tip electrode 70 is supported on one side of an LC layer 72 and an ITO electrode 74 with a large central hole 76 is supported on the opposite side of the LC layer 72. Varying an applied voltage between these two layers will allow control of the focal length (and other optical parameters) of the resulting lens over a wide range.

Figure 8:
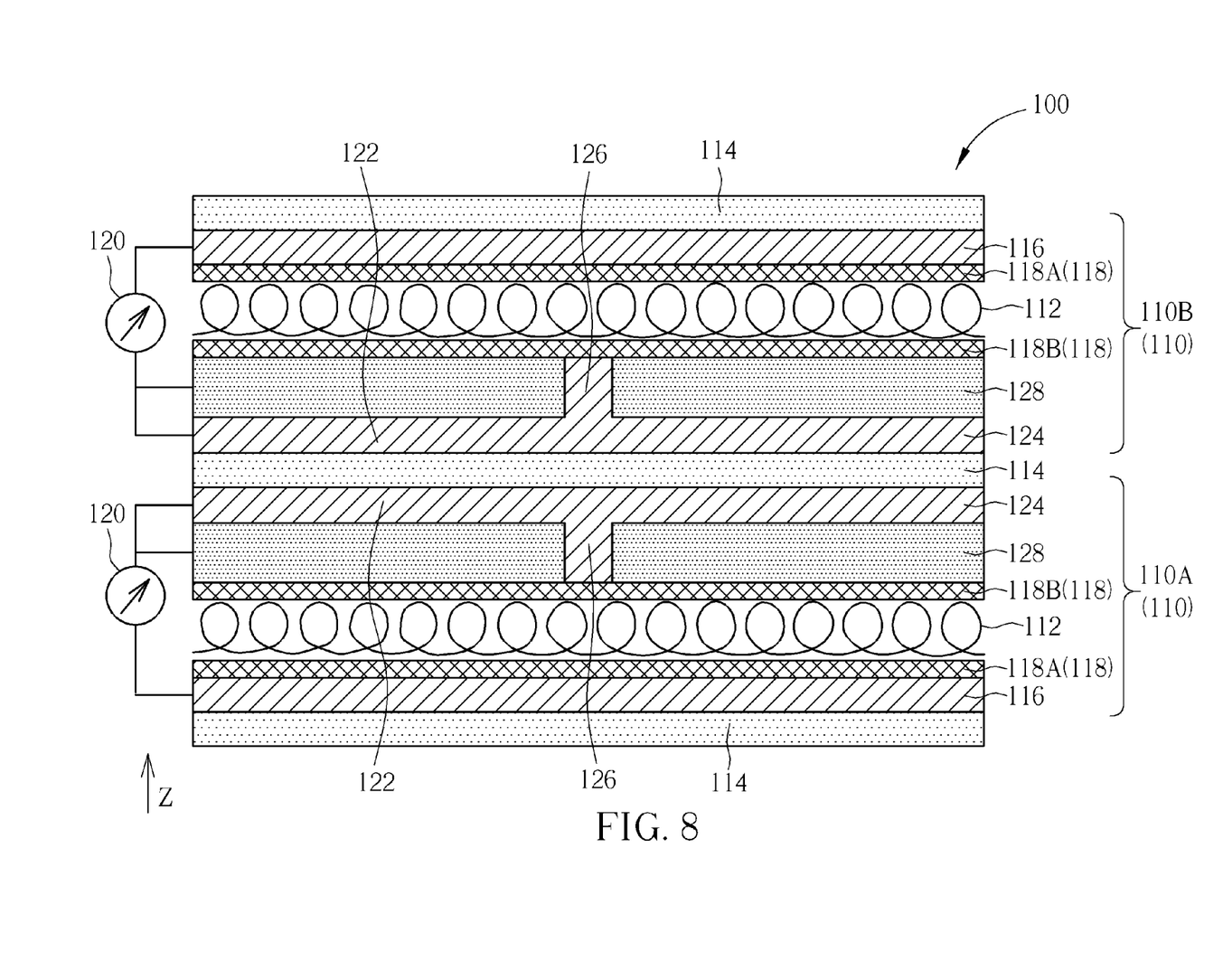
FIG. 8 is a schematic diagram of an electrically tunable liquid crystal cell structure according to a second embodiment of the invention.

FIG. 8 is a schematic diagram of an electrically tunable liquid crystal cell structure according to a second embodiment of the invention. As shown in FIG. 8, an electrically tunable liquid crystal lens set 100 is provided. The electrically tunable liquid crystal lens set 100 may also be referred as a liquid crystal cell constituting electrically controllable focal length lenses. The electrically tunable liquid crystal lens set 100 includes a plurality of liquid crystal lenses 110. Each of the liquid crystal lenses 110 includes a planar liquid crystal layer 112, a first planar electrode 116, a second transparent conductive electrode 124, and a variable voltage power supply 120. The planar liquid crystal layer 112 is supported between an opposed pair of transparent, insulating, alignment layers 118. The alignment layers 118 in this embodiment include a first alignment layer 118A and a second alignment layer 118B, but not limited thereto. The first planar electrode 116 is formed of a transparent conductive material and supported adjacent to one of the alignment layers 118, for example the first alignment layer 118A, on the opposite side of the liquid crystal layer 112. The second transparent conductive electrode 124 is disposed on the second alignment layer 118B on the side opposite to the liquid crystal layer 112, and the second electrode 124 comprises only one central tip electrode 126. The liquid crystal layer 112, the first electrode 116, and the second electrode 124 are stacked along the vertical projective direction Z. The variable voltage power supply 120 is connected to the first electrode 116 and the second electrode 124 so as to impose a nonhomogeneous electric field on the liquid crystal layer 112. The field has a maximum intensity at a center of the electrodes and decreasing toward the edges of the electrodes, so that the refractive index of the liquid crystal layer 112 is adjusted in a nonhomogeneous manner to provide a lens effect to light passing through the liquid crystal lens 110. The focal length of the lens may preferably be a function of the applied voltage between the first electrode 116 and the second electrode 124.

It is worth noting that the liquid crystal lenses 110 overlap to each other along the vertical projective direction Z. In this embodiment, the electrically tunable liquid crystal lens set 100 includes a liquid crystal lens 110A and a liquid crystal lens 110B. The liquid crystal lens 110A overlaps the liquid crystal lens 110B along the vertical projective direction Z. The lens effect of the liquid crystal lens 110A may be identical or opposite to the lens effect of the liquid crystal lens 110B. For example, the liquid crystal lens 110A and the liquid crystal lens 110B may respectively institute a convex lens effect or a concave lens effect, but the present invention is not limited thereto. Each of the liquid crystal lenses may be used to form other appropriate lens effects and the electrically tunable liquid crystal lens set 100 may include more than two liquid crystal lenses 110 for other design considerations.

In this embodiment, the electrically tunable liquid crystal lens set 100 may further include a plurality of glass substrates 114 stacked along the vertical projective direction Z. Two adjacent glass substrates 114 are disposed in contact with the first electrode 116 and the second electrode 124 on the sides of the first electrode 116 and the second electrode 124 opposed to the liquid crystal layer 112. In this embodiment, the second electrode 124 of the liquid crystal lens 110A may be disposed on one of the glass substrate 114 on the side opposite to the second electrode 124 of the liquid crystal lens 110B for forming specific optical effects, but not limited thereto.

Additionally, each of the liquid crystal lenses 110 in this preferred embodiment of the invention differs from the prior art in the structure of one of the ITO layers 122 and in the provision of an insulation layer 128. The ITO layer 122 is formed on the side of one of the glass substrates 114 that opposes the liquid crystal layer 112. The second electrode 124 comprises the ITO layer 122 and the central tip electrode 126 that projects from the surface of the ITO layer 122 toward the LC layer 112. In other words, the ITO layer 122 may be regarded as a layer extending over the entire liquid crystal layer 112 and the central tip electrode 126 may be regarded as an extension section supported at a center of the second electrode 124. The second alignment layer 118B is formed beyond the edge of the central tip electrode 126 so as to be proximate to the LC layer 112. The space between the ITO layer 122 and the second alignment layer 118B is coated with the insulation layer 128. The insulation layer 128 must be electrically insulating and transparent. Preferably $SiO_2$ or $SiOx$ may be employed. The insulation layer 128 may surround a central section in abutment to the second alignment layer 118B. In addition, the central tip electrode 126 in the liquid crystal lens 110 may preferably extend in a direction opposite to the neighbor liquid crystal lens 110. As shown in FIG. 8, a central tip electrode 126 of a liquid crystal lens 110A may extend in a direction opposite to a liquid crystal lens 110B which is adjacent to the liquid crystal lens 110A, and a central tip electrode 126 of the liquid crystal lens 110B may extend in a direction toward the liquid crystal lens 110A. In other words, the central tip electrode 126 of the upper liquid crystal lens 110A may project upwardly to the liquid crystal layer 112, and the central tip electrode 126 of the lower liquid crystal lens 110B may project downwardly to the liquid crystal layer 112, so as to generate a specific optical effect.

The central tip electrode 126 of the second electrode 124 results in a more intense field being opposed in the center of the LC layer 112, compared to its edges, so as to give a lens-like curvature to the refractive index of the LC layer 112. This produces a lens-like effect when incident light passes through the cell. The fringe pattern produced by the central tip electrode 126 in this embodiment is similar to the fringe pattern shown in FIG. 3. The central tip electrode 126 produces a fringe pattern of the highest frequency at the center and lowering in the direction of the edges or a fringe pattern of the lowest frequency at the center and increasing in the direction of the edges. An alternative form of the central tip electrode in this embodiment may be referred to FIG. 4 and the related descriptions detailed above. In other words, the central tip electrode in the alternative form may vary in width from a small tip at an end nearest to the liquid crystal layer to a larger diameter at an opposite end.

An alternative form of insulation layer and ITO layer in this embodiment may also be referred to FIG. 5 and the related descriptions detailed above. Rather than the ITO layer covering the entire surface of the insulation layer as illustrated in FIGS. 8 and 4, a central ITO tip in the form of the central tip electrode 126 of FIG. 8 or 34 of FIG. 4, indicated in FIG. 5 as 40, may be connected to a power supply by an ITO conductor 42 which connects the tip 40 to the edge of the insulation layer so that it can be connected to a power supply. In other words, the tip 40 may be regarded as a central extension section, and the conductor 42 may be regarded as a transparent conductive element connecting the central extension section to one terminal of the power supply.

Figure 9:
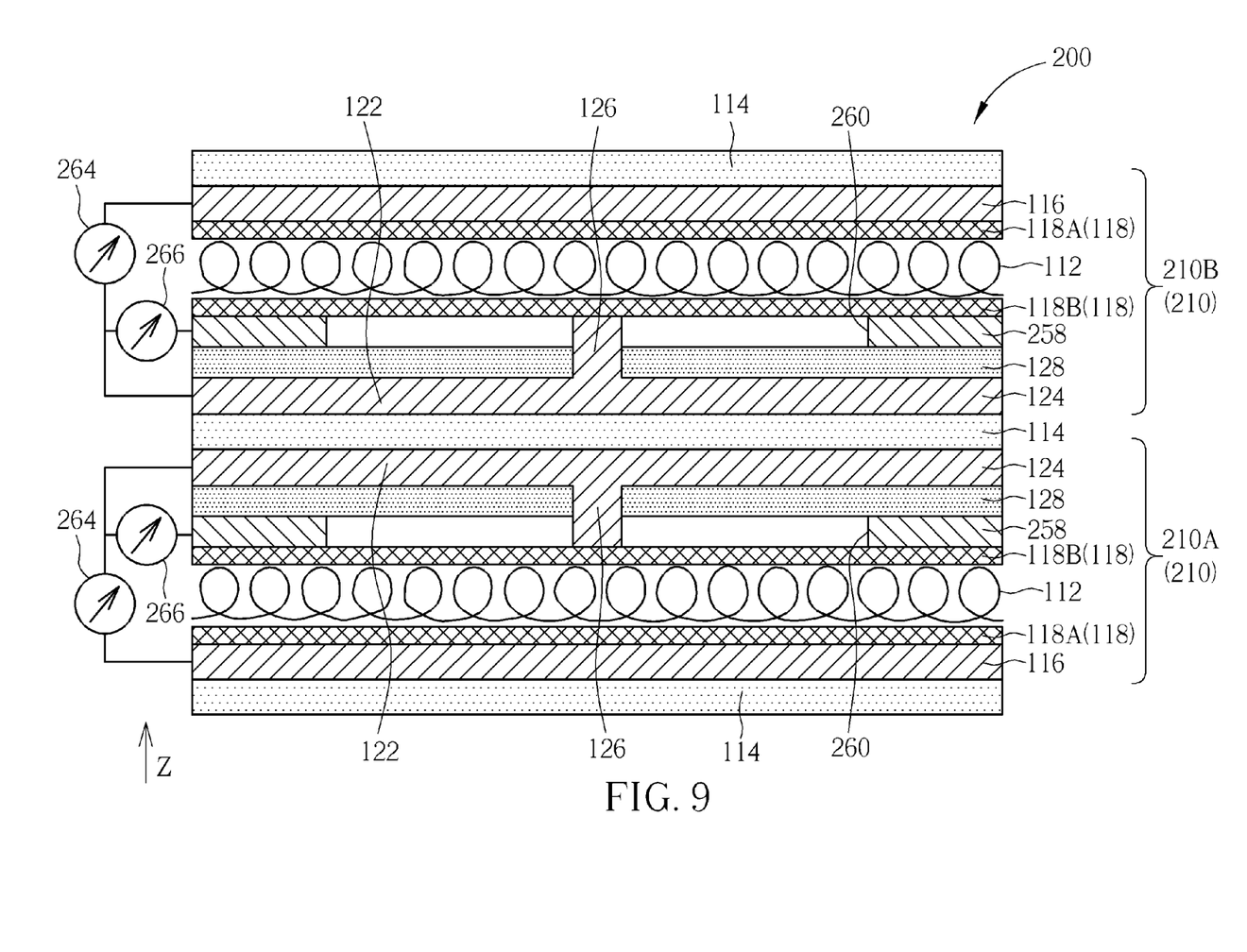
FIG. 9 is a schematic diagram of an electrically tunable liquid crystal lens set according to a third embodiment of the invention.

FIG. 9 is a schematic diagram of an electrically tunable liquid crystal lens set according to a third embodiment of the invention. As shown in FIG. 9, an electrically tunable liquid crystal lens set 200 includes a plurality of liquid crystal lenses 210. The difference between the liquid crystal lenses 210 of this embodiment and the liquid crystal lenses 110 of the second embodiment is that the liquid crystal lens 210 further includes a third electrode 258, a first variable voltage power supply 264, and a second variable voltage power supply 266. The third electrode 258 has a central hole 260 therein and disposed between the second alignment layer 118B and the glass substrate 114 which supports the second electrode 124, with the only one central tip electrode 126 extending centrally through the central hole 260 in the third electrode 258. The third electrode 258 may also be made of ITO. In other words, the third ITO electrode 258 having the central hole 260 is formed surrounding the tip of the ITO layer 122. The first variable voltage power supply 264 connects to the central tip electrode 126. The second variable voltage power supply 266 is connected between the terminal of the first variable voltage power supply 264 that connects to the central tip electrode 126 and the third electrode 258 with the central hole 260. The other terminal of the first variable voltage power supply 264 connects to the first electrode 116 supported on the opposite side of the liquid crystal layer 112. By varying the voltages imposed by the power supply 264 and 266, the focal length (and other optical parameters such as a spherical effects) of the resulting lens can be carefully controlled between a focus at near infinity and a focus within a few centimeters of the cell. In other words, the second variable voltage power supply 266 may be regarded as a separate variable voltage power supply operative to vary the voltage between the third electrode 258 and the first electrode 116. The third electrode 258 may be used to form a horizontal field on the liquid crystal layer 112 and the third electrode 258 may be used as an accelerator of the response time of the liquid crystal molecules in the liquid crystal layer 112. In this embodiment, a lens effect of a liquid crystal lens 210A may be identical or opposite to a lens effect of a liquid crystal lens 210B. The second electrode 124 of the liquid crystal lens 210A may be disposed on one of the glass substrate 114 on the side opposite to the second electrode 124 of the liquid crystal lens 210B for forming specific optical effects, but not limited thereto.

Figure 10:
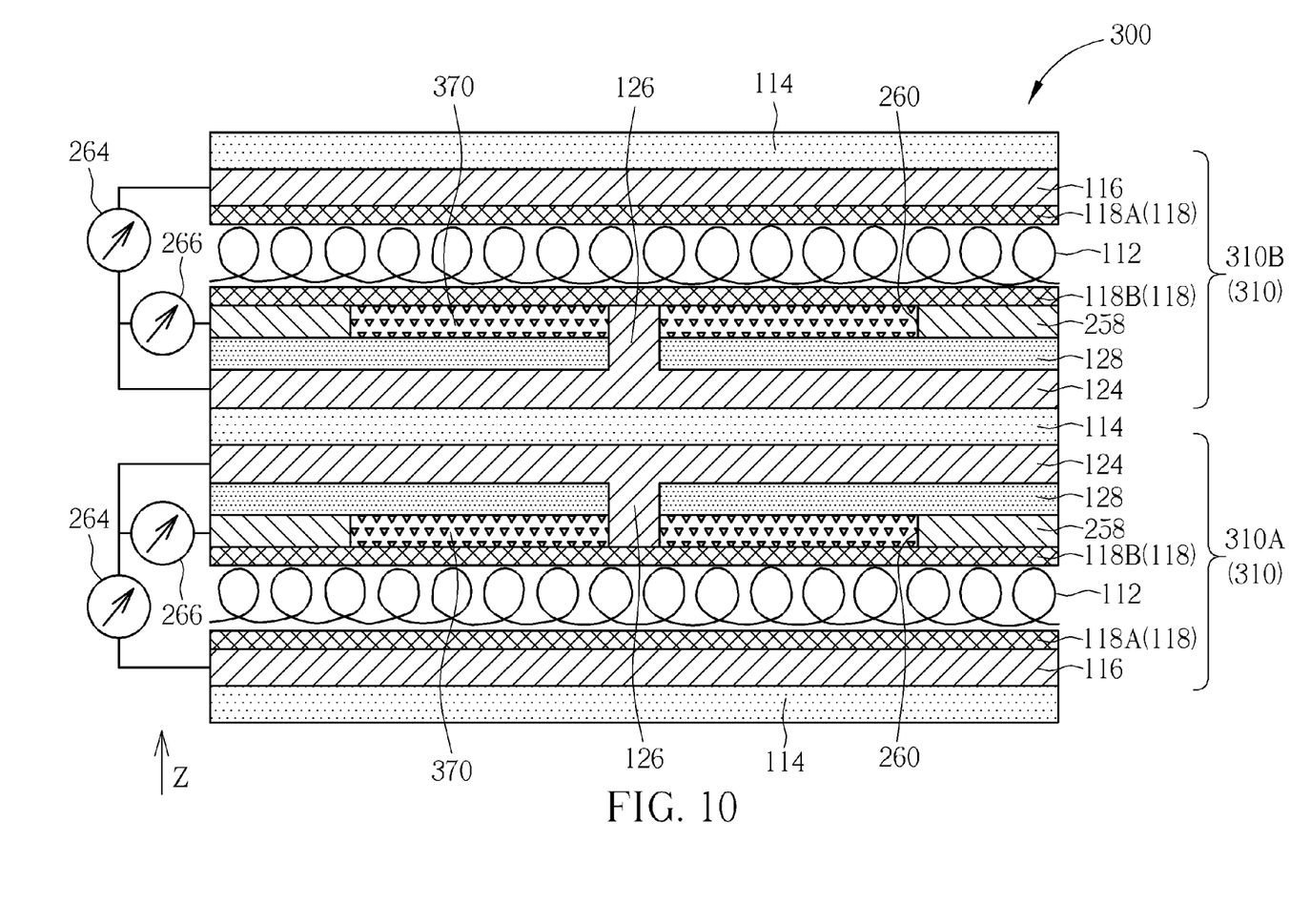
FIG. 10 is a schematic diagram of an electrically tunable liquid crystal lens set according to a fourth embodiment of the invention.

FIG. 10 is a schematic diagram of an electrically tunable liquid crystal lens set according to a fourth embodiment of the invention. As shown in FIG. 10, an electrically tunable liquid crystal lens set 300 includes a plurality of liquid crystal lenses 310. The difference between the liquid crystal lenses 310 of this embodiment and the liquid crystal lenses 210 of the third embodiment is that the liquid crystal lens 310 further includes a high resistance material layer 370 disposed in the central hole 260 of the third electrode 258. The high resistance material layer 370 may be used to optimize the electrical field between the first electrode 116, the second electrode 124, and the third electrode 258. In this embodiment, a lens effect of a liquid crystal lens 310A may be identical or opposite to a lens effect of a liquid crystal lens 310B. The second electrode 124 of the liquid crystal lens 310A may be disposed on one of the glass substrate 114 on the side opposite to the second electrode 124 of the liquid crystal lens 310B for forming specific optical effects, but not limited thereto.

Figure 11:
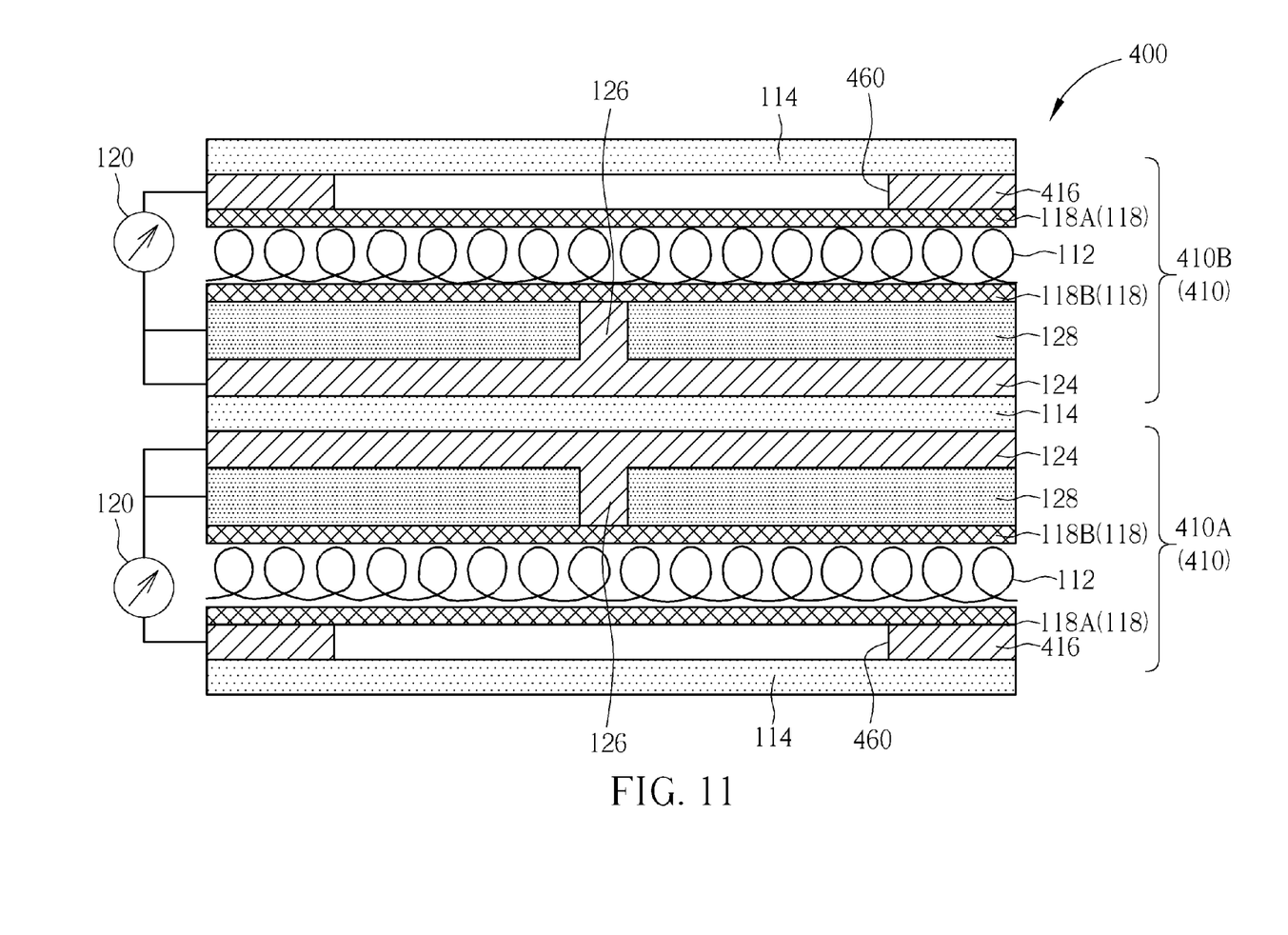
FIG. 11 is a schematic diagram of an electrically tunable liquid crystal lens set according to a fifth embodiment of the invention.

FIG. 11 is a schematic diagram of an electrically tunable liquid crystal lens set according to a fifth embodiment of the invention. As shown in FIG. 11, an electrically tunable liquid crystal lens set 400 includes a plurality of liquid crystal lenses 410. The difference between the liquid crystal lenses 410 of this embodiment and the liquid crystal lenses 110 of the first preferred embodiment is that the second electrode 124 including the central tip electrode 126 is supported on one side of the LC layer 112 and a first electrode 416 with a large central hole 460 is supported on the opposite side of the LC layer 112. Varying an applied voltage between the first electrode 416 and the second electrode 124 will allow control of the focal length (and other optical parameters) of the resulting lens over a wide range. In this embodiment, a lens effect of a liquid crystal lens 410A may be identical or opposite to a lens effect of a liquid crystal lens 410B. The second electrode 124 of the liquid crystal lens 410A may be disposed on one of the glass substrate 114 on the side opposite to the second electrode 124 of the liquid crystal lens 410B for forming specific optical effects, but not limited thereto.

Figure 12:
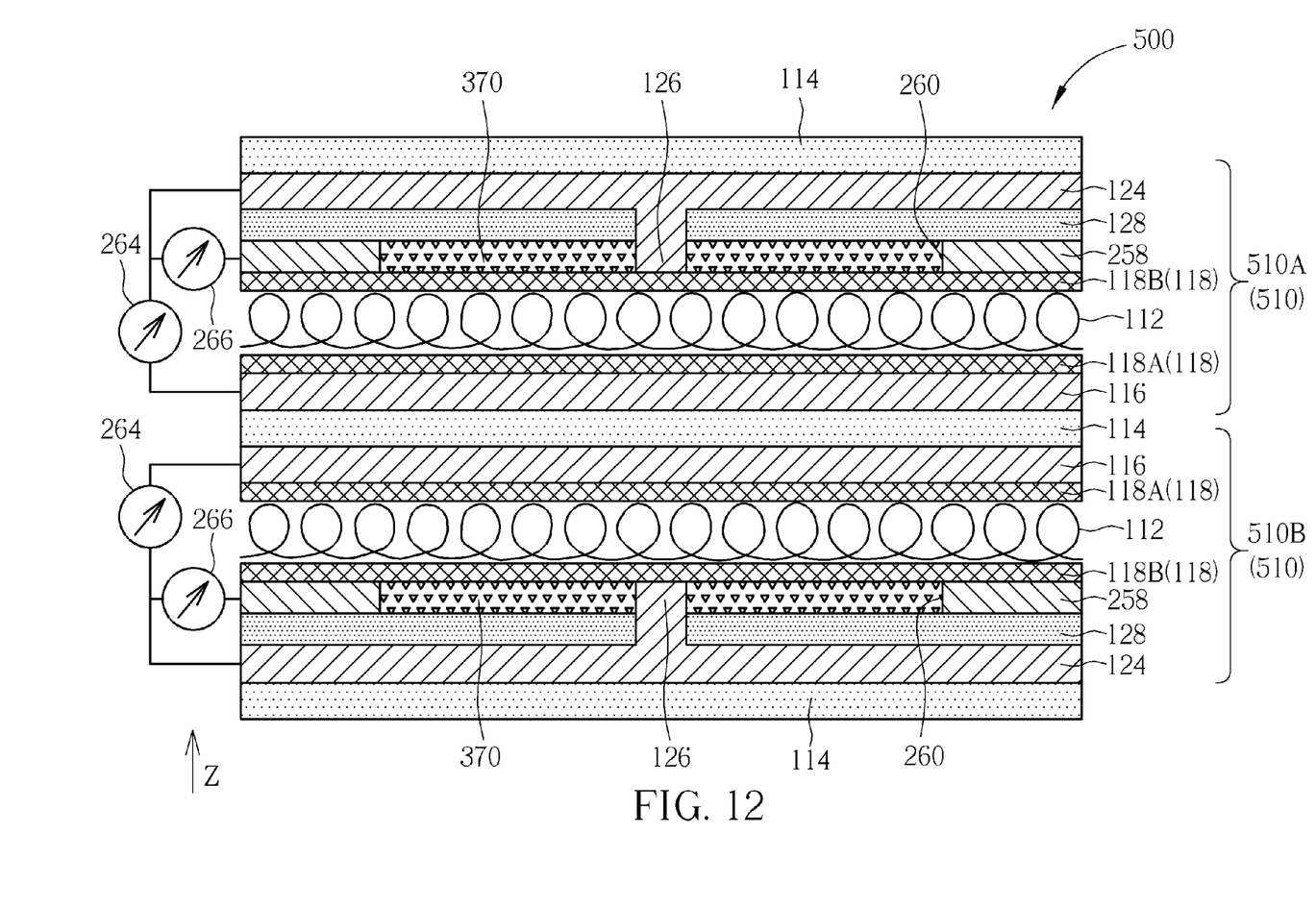
FIG. 12 is a schematic diagram of an electrically tunable liquid crystal lens set according to a sixth embodiment of the invention.

FIG. 12 is a schematic diagram of an electrically tunable liquid crystal lens set according to a sixth embodiment of the invention. As shown in FIG. 12, an electrically tunable liquid crystal lens set 500 includes a plurality of liquid crystal lenses 510. The difference between the liquid crystal lenses 510 of this embodiment and the liquid crystal lenses 310 of the fourth preferred embodiment is that the central tip electrode 126 extends in a direction toward the neighbor liquid crystal lens 510. As shown in FIG. 12, a central tip electrode 126 of a liquid crystal lens 510A may extend in a direction toward a liquid crystal lens 510B which is adjacent to the liquid crystal lens 510A, and a central tip electrode 126 of the liquid crystal lens 510B may extend in a direction toward the liquid crystal lens 510A. In other words, the central tip electrode 126 of the upper liquid crystal lens 510A may project downwardly to the liquid crystal layer 112, and the central tip electrode 126 of the lower liquid crystal lens 510B may project upwardly to the liquid crystal layer 112, so as to generate a specific optical effect.

Figure 13:
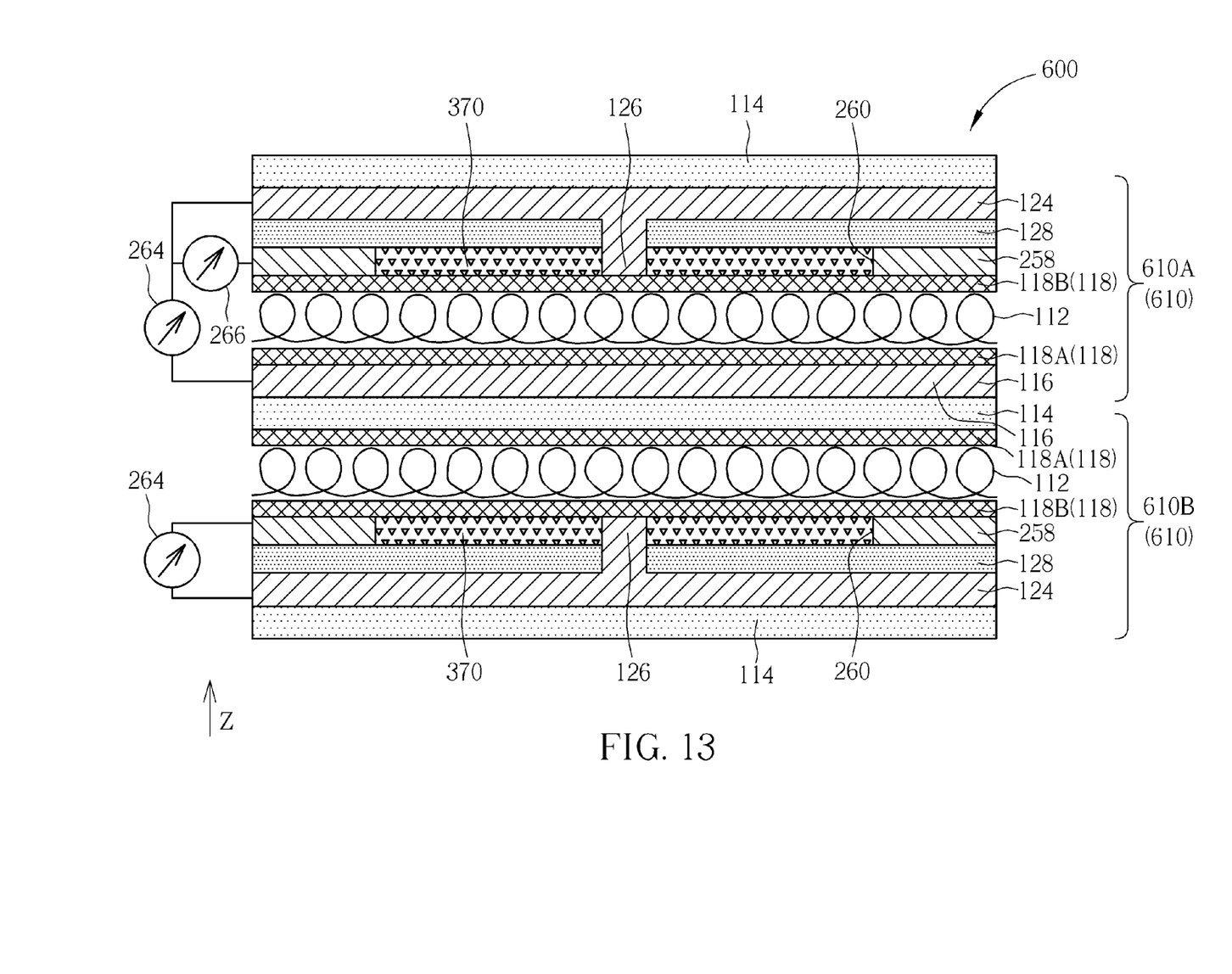
FIG. 13 is a schematic diagram of an electrically tunable liquid crystal lens set according to a seventh embodiment of the invention.

FIG. 13 is a schematic diagram of an electrically tunable liquid crystal lens set according to a seventh embodiment of the invention. As shown in FIG. 13, an electrically tunable liquid crystal lens set 600 includes a plurality of liquid crystal lenses 610. The difference between the liquid crystal lenses 610 of this embodiment and the liquid crystal lenses 510 of the fifth preferred embodiment is that in a lower liquid crystal lens 610B, one of the glass substrates 114 is disposed between the first electrode 116 and the liquid crystal layer 112 of the liquid crystal lens 610B. In other words, an upper liquid crystal lens 610A and the lower liquid crystal lens 610B in the electrically tunable liquid crystal lens set 600 share one first electrode 116. The structure of the electrically tunable liquid crystal lens set 600 may be simplified accordingly.

To summarize the above descriptions, in the electrically tunable liquid crystal lens set of the present invention, the central tip electrode in each liquid crystal lens is used to impose a nonhomogeneous electric field on the liquid crystal layer. The liquid crystal lenses are disposed in a stacked configuration and two adjacent liquid crystal lenses may constitute identical or opposite lens effects for generating different optical effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrically tunable liquid crystal lens set comprising:
a plurality of liquid crystal lenses, each of the liquid crystal lenses comprising:
  a planar liquid crystal layer supported between an opposed pair of transparent, insulating, alignment layers;
  a first planar electrode formed of a transparent conductive material supported adjacent to one of the alignment layers on the opposite side of the liquid crystal layer;
  a second transparent conductive electrode disposed on the second alignment layer on the side opposite to the liquid crystal layer, the second electrode comprising only one central tip electrode, wherein the liquid crystal layer, the first electrode, and the second electrode are stacked along a vertical projective direction; and
  a variable voltage power supply connected to the first and second electrodes so as to impose a nonhomogeneous electric field on the liquid crystal layer, the field having a maximum intensity at a center of the electrodes and decreasing toward the edges of the electrodes, so that the refractive index of the liquid crystal layer is adjusted in a nonhomogeneous manner to provide a lens effect to light passing through the liquid crystal lens, the focal length of the lens being a function of the applied voltage between the first and the second electrodes;
wherein the liquid crystal lenses overlap to each other along the vertical projective direction.

2. The liquid crystal lens set of claim 1, wherein at least one of the liquid crystal lenses comprises a transparent insulation layer surrounding a central section in abutment to the alignment layer.

3. The liquid crystal lens set of claim 1, further including a plurality of glass substrates, wherein two adjacent glass substrates are disposed in contact with the first and second electrodes.

4. The liquid crystal lens set of claim 3, wherein two adjacent glass substrates are disposed on the sides of the first and second electrodes opposed to the liquid crystal layer.

5. The liquid crystal lens set of claim 3, wherein at least one of the glass substrates is disposed between the first electrode and the liquid crystal layer.

6. The liquid crystal lens set of claim 1, wherein the second electrode further comprises a layer extending over the entire liquid crystal layer and having an extension section supported at a center of the second electrode.

7. The liquid crystal lens set of claim 1, wherein at least one of the liquid crystal lenses further comprises a transparent conductive element connecting a central extension section to one terminal of the power supply.

8. The liquid crystal lens set of claim 1, wherein the only one central tip electrode varies in width from a small tip at an end nearest to the liquid crystal layer to a larger diameter at an opposite end.

9. The liquid crystal lens set of claim 1, wherein the first electrode has a central hole therein.

10. The liquid crystal lens set of claim 3, wherein at least one of the liquid crystal lenses further comprises a third electrode having a central hole therein and disposed between one of the alignment layers and the glass substrate which supports the second electrode, with the only one central tip electrode extending centrally through the central hole in the third electrode; and a separate variable voltage power supply operative to vary the voltage between the third electrode and the first electrode.

11. The liquid crystal lens set of claim 10, wherein at least one of the liquid crystal lenses comprises a high resistance material layer disposed in the central hole of the third electrode.

12. The liquid crystal lens set of claim 1, wherein the transparent conductive electrodes constitute indium tin oxide.

13. The liquid crystal lens set of claim 1, wherein the central tip electrode extends in a direction opposite to the neighbor liquid crystal lens.

14. The liquid crystal lens set of claim 1, wherein the central tip electrode extends in a direction toward the neighbor liquid crystal lens.

15. A liquid crystal cell constituting electrically controllable focal length lenses, comprising:
a plurality of glass substrates stacked along a vertical projective direction; and
a plurality of liquid crystal lenses, each of the liquid crystal lenses comprising:
a liquid crystal layer sandwiched between first and second planar insulating transparent alignment layers;
a first transparent conductive electrode coated on a surface of the first alignment layer opposed to the liquid crystal layer and extending over the full width of the first alignment layer;
a second conductive transparent electrode supported on the side of the second alignment layer opposed to the liquid crystal layer, the second electrode having only one central tip electrode, wherein the liquid crystal layer, the first electrode, and the second electrode are stacked along the vertical projective direction;
a transparent insulation layer disposed in contact with the side of the second alignment layer opposite to the liquid crystal layer and surrounding a projecting section of the second electrode; and
a variable voltage power supply connected to the first and second electrodes and operative to impose a non-homogeneous electric field on the liquid crystal layer, the voltage of the power supply determining the focal length of the resulting lens, wherein the liquid crystal lenses overlap to each other along the vertical projective direction, and two adjacent glass substrates are disposed in contact with the first and second electrodes on their sides opposite to the liquid crystal layer.

* * * * *